US007506116B2

(12) United States Patent
Haselton et al.

(10) Patent No.: US 7,506,116 B2
(45) Date of Patent: Mar. 17, 2009

(54) MAINTAINING AND USING INFORMATION ON UPDATES TO A DATA GROUP AFTER A LOGICAL COPY IS MADE OF THE DATA GROUP

(75) Inventors: William Robert Haselton, Peabody, MA (US); Christopher John Stakutis, Concord, MA (US); Kevin Michael Stearns, Maynard, MA (US)

(73) Assignee: International Business Machines Corporation, Armonk, NY (US)

( * ) Notice: Subject to any disclaimer, the term of this patent is extended or adjusted under 35 U.S.C. 154(b) by 563 days.

(21) Appl. No.: 11/184,358

(22) Filed: Jul. 19, 2005

(65) Prior Publication Data

US 2007/0022319 A1 Jan. 25, 2007

(51) Int. Cl.
*G06F 12/16* (2006.01)
*G06F 17/30* (2006.01)
(52) U.S. Cl. ................. 711/162; 707/202; 707/204; 714/15
(58) Field of Classification Search ................. None
See application file for complete search history.

(56) References Cited

U.S. PATENT DOCUMENTS

| 5,557,770 | A | 9/1996 | Bhide et al. |
| 5,835,953 | A | 11/1998 | Ohran |
| 6,604,118 | B2 | 8/2003 | Kleiman et al. |
| 6,636,878 | B1 | 10/2003 | Rudoff |
| 6,748,504 | B2 | 6/2004 | Sawdon et al. |
| 6,829,688 | B2 | 12/2004 | Grubbs et al. |
| 7,296,125 | B2 * | 11/2007 | Ohran ................. 711/162 |
| 7,334,098 | B1 * | 2/2008 | Poston ................. 711/162 |
| 2003/0101321 | A1 | 5/2003 | Ohran |
| 2003/0131278 | A1 | 7/2003 | Fujibayashi |

(Continued)

OTHER PUBLICATIONS

PCT International Search Report and Written Opinion mailed Oct. 10, 2006 for Application No. PCT/EP2006/063050 filed Jun. 9, 2006.

(Continued)

*Primary Examiner*—Gary J Portka
(74) *Attorney, Agent, or Firm*—David Victor; Konrad Raynes & Victor LLP

(57) ABSTRACT

Provided are a method, system and program for maintaining and using information on updates to a data group after a logical copy is made of the data group. A first logical copy of a data group in a storage at a first point-in-time is established. The first logical copy maintains data to reconstruct the data group as of the first point-in time after the data group has been updated following the first-point-in time. Indication is made of regions of the data group updated at the storage after establishing the first logical copy. A second logical copy of the data group in the storage at a second point-in-time is established. The second logical copy maintains data to reconstruct the data group as of the second point-in time after the data group has been updated following the second point-in time. The indicated regions of the data group updated between the first and second points-in-time are saved in a change list.

9 Claims, 6 Drawing Sheets

U.S. PATENT DOCUMENTS

2003/0195903 A1 10/2003 Manley et al.
2004/0010487 A1 1/2004 Prahlad et al.
2004/0034752 A1 2/2004 Ohran
2004/0088301 A1 5/2004 Mahalingam et al.
2004/0107225 A1 6/2004 Rudoff
2004/0163009 A1 8/2004 Goldstein et al.
2005/0027956 A1 2/2005 Tormasov et al.

OTHER PUBLICATIONS

IBM Corporation, "Storage Management Mechanism for Managing Snapshot Pages", Technical Disclosure Bulletin, vol. 35, No. 4B, Sep. 1992, pp. 26-29.

A. Pate, et al., "Implementing SnapShot", IBM International Technical Support Organization, Document No. SG24-2241-01, Jul. 1999, Chapters 1 and 2.

* cited by examiner

MAINTAINING AND USING INFORMATION ON UPDATES TO A DATA GROUP AFTER A LOGICAL COPY IS MADE OF THE DATA GROUP

BACKGROUND OF THE INVENTION

1. Field of the Invention

The present invention relates to a method, system, and program for maintaining and using information on updates to a data group after a logical copy is made of the data group.

2. Description of the Related Art

Backup programs backup data at a computer system to a backup storage device, which may comprise a local storage device or remote storage device. Certain backup programs provide management of the backed up files and may utilize a backup database having information on the status of backed-up files. Such managed backup programs typically store the data in a proprietary storage format and utilize complex backup client and backup server programs to manage the backup operations in a network environment. The managed backup program must be used to restore the files maintained in the proprietary backup format.

In addition to maintaining back-ups of data, certain copy programs create logical copies or an image of a volume instantly, without having to physically copy the data subject to the copy operation. After the logical copy is established, any updates to the data subject to the logical copy operation are moved to the logical copy before the update is applied to allow return to the data as of the point-in-time the copy was created. Snapshot copy is a copy program offered by different software vendors that is used to create an instantaneous logical point-in-time copy of data.

Certain backup environments employ the use of distributed storage devices, which may be in different locations, to maintain backup copies of data. Although it may be desirable to have a remote machine maintain the logical copies of a backup data group, the logical copies and accompanying data structure of the data group created on one machine may not be useable on another machine with the same or different logical copy program, e.g., Snapshot program.

SUMMARY

Provided are a method, system and program for maintaining and using information on updates to a data group after a logical copy is made of the data group. A first logical copy of a data group in a storage at a first point-in-time is established. The first logical copy maintains data to reconstruct the data group as of the first point-in time after the data group has been updated following the first-point-in time. Indication is made of regions of the data group updated at the storage after establishing the first logical copy. A second logical copy of the data group in the storage at a second point-in-time is established. The second logical copy maintains data to reconstruct the data group as of the second point-in time after the data group has been updated following the second point-in time. The indicated regions of the data group updated between the first and second points-in-time are saved in a change list.

DETAILED DESCRIPTION

Figure 1:
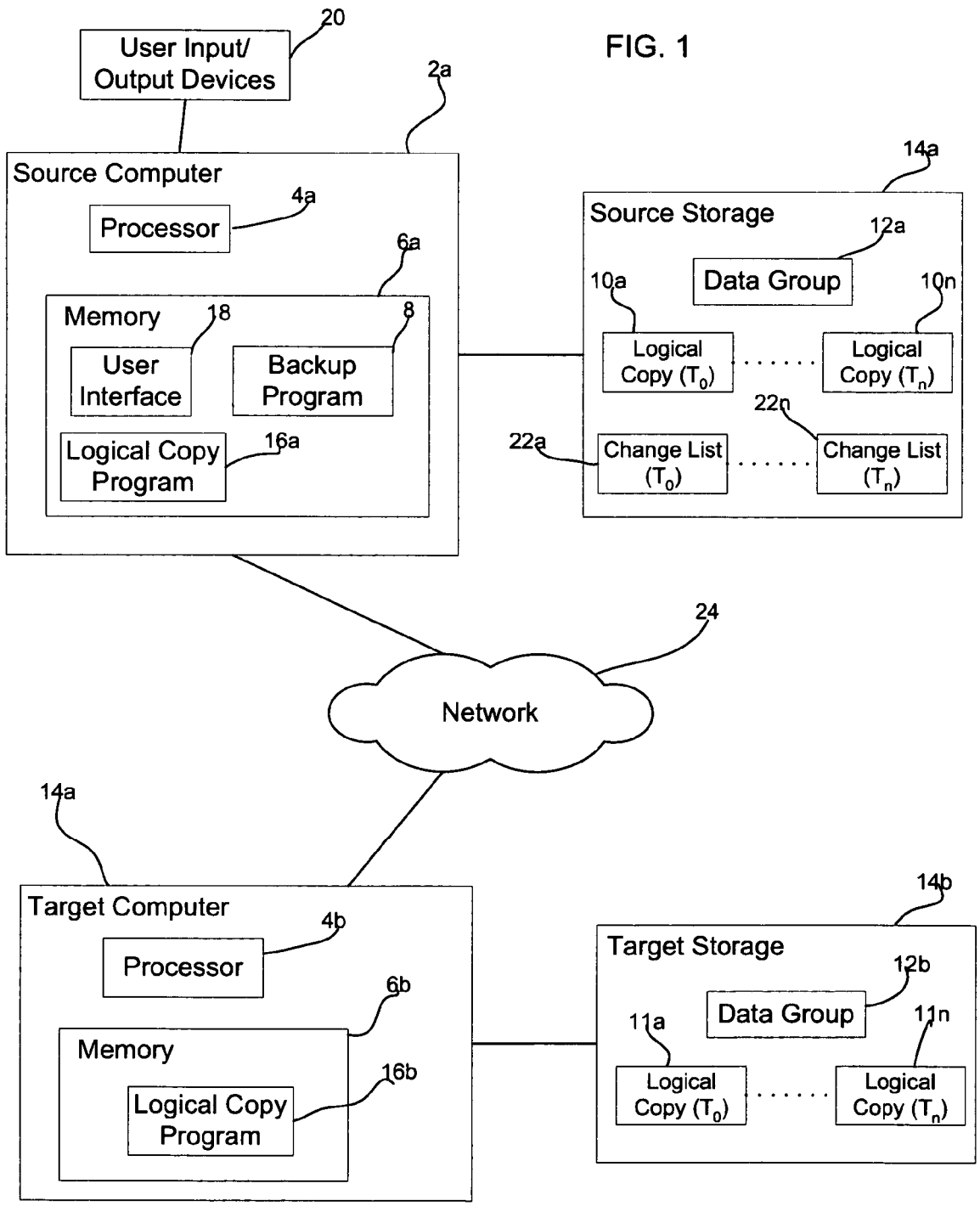
FIG. 1 illustrates an embodiment of a computing environment.

FIG. 1 illustrates a computing environment in which embodiments are implemented. A source computer 2a includes a processor 4a and a memory 6a comprised of one or more memory devices including the programs and code executed by the processor 4a. A backup program 8 executing in the memory 6a maintains logical copies 10a . . . 10n of a data group 12a in a source storage 14a as of one or more points-in-time ($T_0$ . . . $T_n$). The backup program 8 may invoke a logical copy program 16a, which generates a logical copy 10a . . . 10n as of a point-in-time. In one embodiment, the copy program 16a may utilize Snapshot technology. With Snapshot technology, a logical copy 10a . . . 10n, which may be in a different location in storage from the data group 12a, is immediately established as of a point-in-time. The Snapshot program copies data to the logical copy in response to receiving an update to that data group 12a, 12b and before the data is updated if the data has not been updated since the time the logical copy 10a . . . 10n, 11a . . . 11n was established. Other logical copy technologies may be used to establish an instant point-in-time copy of the data group 12a, 12b.

The backup program 8 may render a user interface 18 to enable the user to enter and review, via user Input/Output (I/O) devices 20 (e.g., such as a mouse, display monitor, keyboard etc.) backup settings indicating a schedule during which the backup program 8 creates a new logical copy, i.e., creates a new Snapshot copy, and other settings, such as a limit on the number of logical copies, etc. When updates are received, the backup program 8 indicates the data that is updated in a change list 22a . . . 22n. The change list 22a . . . 22n as of a point-in-time, e.g., $T_i$, indicates updates received since the last logical copy was created, e.g., $T_i$, and the current point-in-time ($T_{i+1}$). Thus, the logical copy at the point-in-time $T_i$ plus the updates indicated in the change list $T_{i+1}$ comprises the data in the data group as of $T_{i+1}$. In certain embodiments, the change list 22a . . . 22n information is maintained independently of the logical copy program 8, e.g., Snapshot, related operations. Further, Application Programming Interfaces (APIs) may be used to provide an interface to the change lists 22a . . . 22n to allow the backup program 8 to query the change list 22a . . . 22n to determine the changed blocks and send those blocks to the target computer 14a for remote backup storage.

FIG. 1 further shows a target computer 2b, including many of the components of the source computer 2a, including a processor 4b, a memory 4b, a logical copy program 8b, an attached target storage 14b having a data group 12b providing a mirror copy of the data group 12a at an initial time ($T_0$), and logical copies 11a . . . 11n for different points-in-time ($T_0$ . . . $T_n$) that correspond to the point-of-times at which logical copies 10a . . . 10n were established in the source storage 14a. A data group 12a, 12b comprises any user specified group of data blocks in the storage 14a, 14b that has been selected to be included in a backup set managed by the backup program 8. The data group 12a, 12b may comprise a volume, selected file sets or other suitable grouping of data in storage. The source 2a and target 2b computers may communicate over a network 24, which may comprise a Local Area Network (LAN), Storage Area Network (SAN), Wide Area Network (WAN), wireless network, etc. Alternatively, the computers 2a and 2b may connect using different connection technologies, such as a Peer-to-Peer connection, parallel cables, etc.

The storages 14a, 14b may be implemented in storage devices known in the art, such as one hard disk drive, a plurality of interconnected hard disk drives configured as Direct Access Storage Device (DASD), Redundant Array of Independent Disks (RAID), Just a Bunch of Disks (JBOD), etc., a tape device, an optical disk device, a non-volatile electronic memory device (e.g., Flash Disk), etc.

In one embodiment, the target data group 12b replicates the backed-up source data group 12a, such that the directories and files in the target data group 12b are in the native file format of the corresponding source directories and files in the data group 12a. In such embodiments, the target data group 12b files may be directly accessed by the applications that created the files.

In one embodiment, the logical copy programs 16a and 16b on the source 2a and target 2b computers, respectively, may be from different vendors and use different logical copy (e.g., Snapshot) technologies to establish the logical copies. In one embodiment, the logical copy programs 16a, 16b may use the same general logical copy technology, e.g., Snapshot, but have implementations of this common technology from different vendors providing different and perhaps incompatible implementations of the logical copy technology. In an additional embodiment, the different logical copy programs 16a and 16b may use entirely different logical copy technologies.

In one embodiment, the backup program 8 is a separate program from the logical copy program 16a and may invoke the logical copy program 16a via application programming interface (API) calls. In an alternative embodiment, the backup program 8 and logical copy program 16a may be integrated in a single copy program. In yet a still further embodiment, to invoke the logical copy program 16a, the backup program 8 may alert via the user interface 18 the user or administrator to invoke the logical copy programs 16a and 16b to create logical copies 10a ... 10n. To invoke the target logical copy program 16b to create a logical copy 11a ... 11n, the backup program 8 may transmit commands over the network 24 to the target logical copy program 16b or provide an alert to notify the user/administrator to invoke the target logical copy program 16 to create the target logical copies 11a ... 1n. In this way, the backup program 8 generates a signal to cause the establishment of a logical copy 11a ... 11n or 12a ... 12n of the data groups 12a or 12b at the source 14 or target 14b storage. This signal may generate an alert to notify a user/administrator to invoke the logical copy program 16a or 16b to create the logical copy 11a ... 11n or 12a ... 12n or comprise a signal that is transmitted to the logical copy program 16a or 16b to generate the logical copy.

Figure 2:
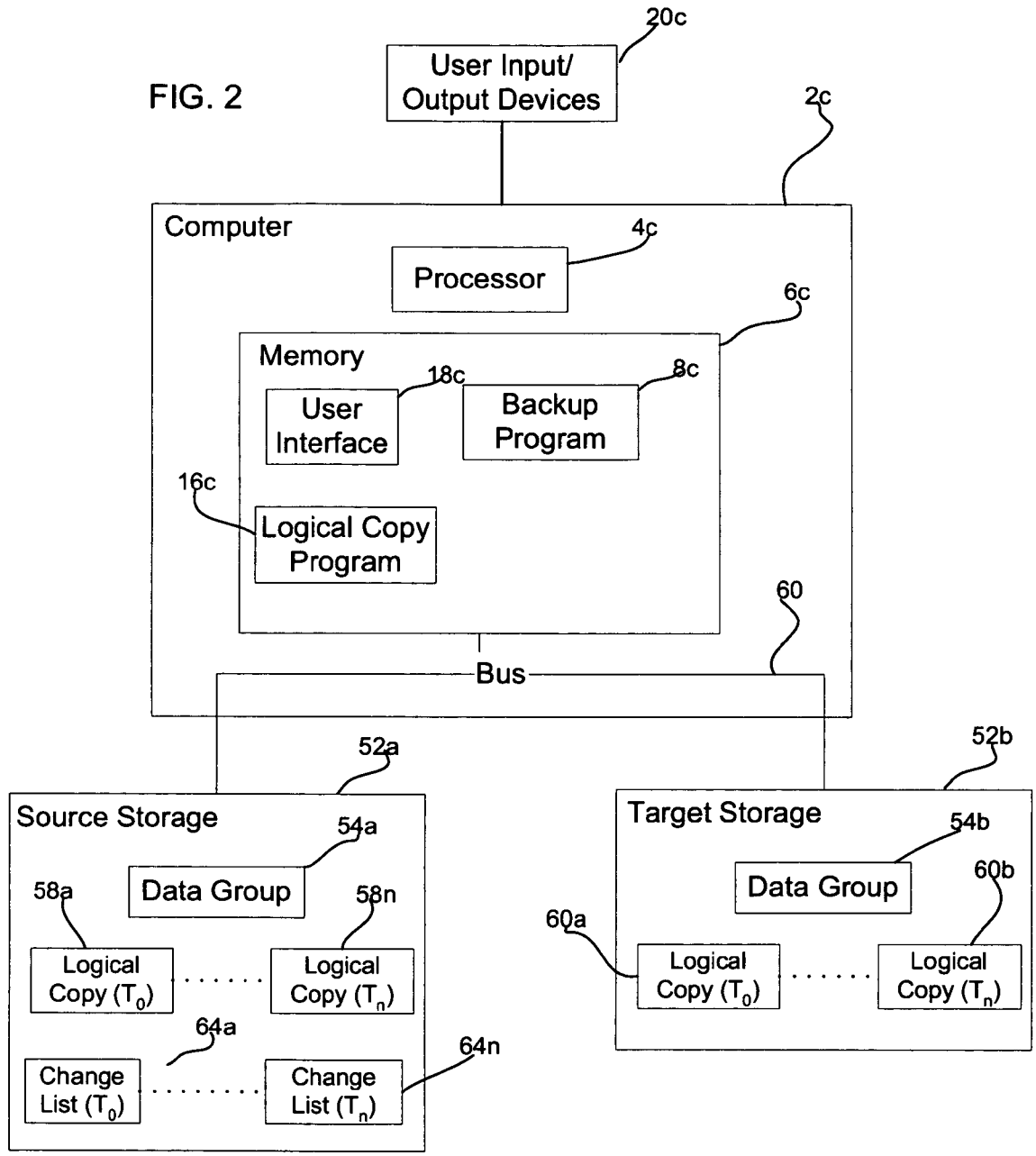
FIG. 2 illustrates an additional embodiment of a computing environment.

FIG. 2 illustrates an alternative embodiment of a computing environment. In the embodiment of FIG. 2, the computer 2c includes many of the same components found in the source computer 2a, including a processor 4c, a memory 6c, a logical copy program 8c, an attached target storage 52b having a data group 54b providing a mirror copy of a data group 54a in an attached source storage 52a at an initial time ($T_0$). In the embodiment of FIG. 2, the computer 2c communicates and facilitates data transfer between the source storage 52a and target storage 52b over a common data communication bus 56. The computer 2c uses a single logical copy program 8c to create logical copies 58a ... 58n and 60a ... 60n on the source 52a and target 52b storages, respectively. The backup program 8c further creates change lists 64a ... 64n providing updates made between points-in-time between two consecutive logical copies. In the embodiment of FIG. 2 a single logical copy program 16c is used to create logical copies 58a ... 58n and 60a ... 60n on both the source 52a and target 52b storages.

Figure 3:
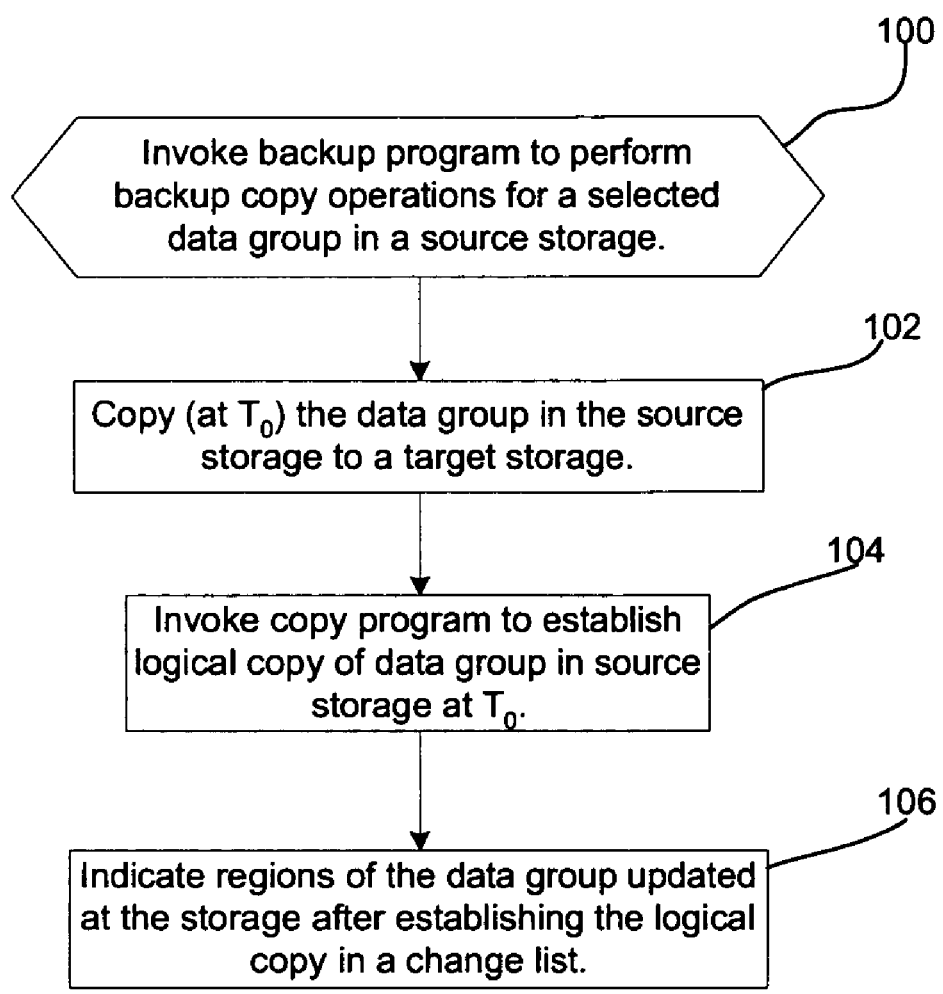
FIG. 3 illustrates an embodiment of operations performed by a backup program to initiate operations to maintain logical copies of a data group.

FIG. 3 illustrates operations performed by the backup program 8 when invoked to provide a backup copy of a data group 12a. In response to being invoked (at block 100), the backup program 8 copies (at block 102) at $T_0$, an initial time, the data group 12a in the source storage 14a to a data group 12b in the target storage 14b to provide an initial mirror copy in the target storage 14b consistent with the source storage 14a as of $T_0$. The backup program 8 invokes (at block 104) the logical copy program 16a to establish a logical copy 10a of the data group 12a in the source storage at a point-in-time of $T_0$. When establishing a logical copy 10a ... 10n, 11a ... 11n, the logical copy programs 16a, 16b may create bitmaps or some other data structures representing the blocks in the data group subject to the logical copy relationship to provide metadata for the blocks in the data group. Such metadata may indicate whether a block has been updated since the logical copy was created. The backup program 8 may invoke the logical copy program 16a via an API or be integrated in a backup program having code implementing the functionality of both the backup program 8 and logical copy program 16a. Alternatively, the backup program 8 may alert a user of the source computer 2a to invoke the logical copy program 16a to create the initial logical copy 10a. After the logical copy 10a is established, the backup program 8 monitors updates to the data group 12a in the source storage 14a and indicates (at block 106) an update and the blocks updated in a change list ($T_0$) 22a associated with the logical copy 10a, such that the change list ($T_0$) 22a indicates changes subsequent to the initial point-in-time ($T_0$) and prior to the time of a next logical copy, e.g., $T_1$.

Figure 4:
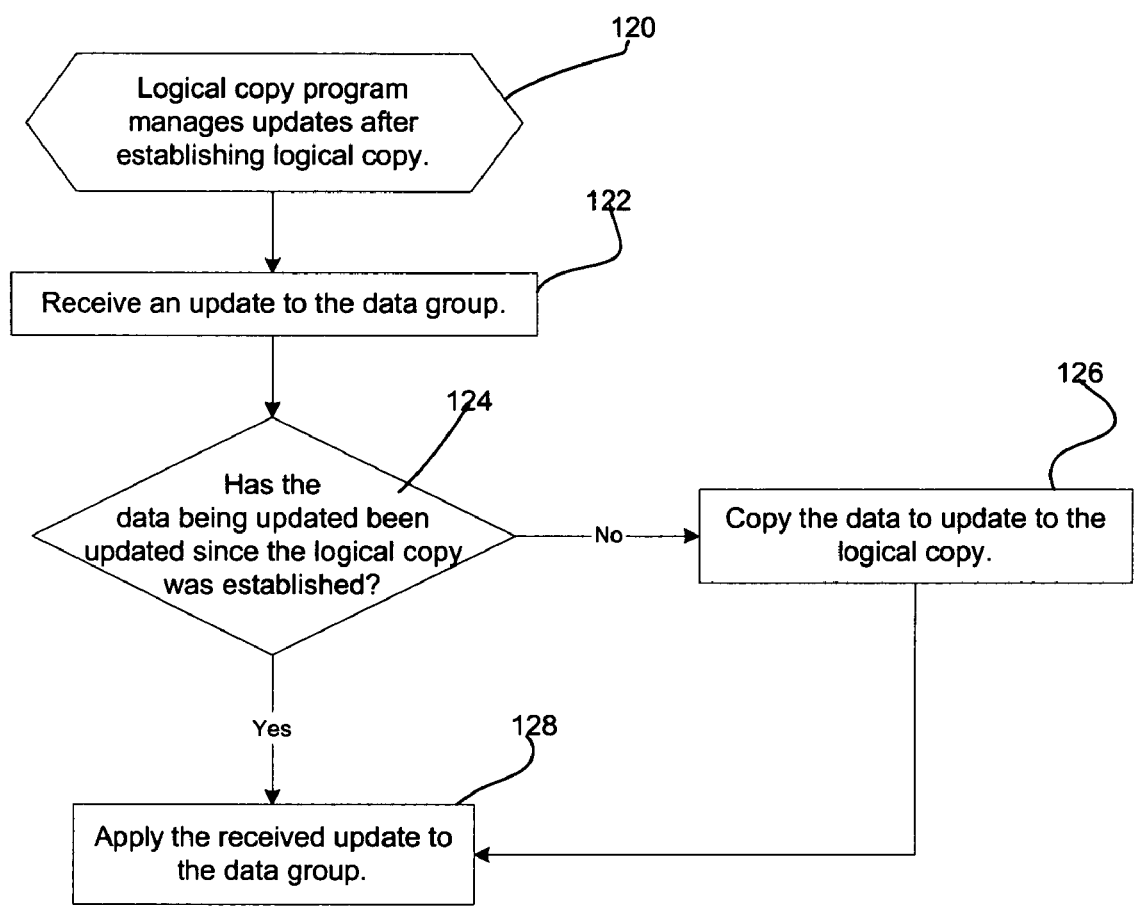
FIG. 4 illustrates an embodiment of operations to maintain the logical copies of data.

FIG. 4 illustrates operations implemented in the logical copy programs 16a, 16b to manage (at block 120) updates to the data region. In response to receiving (at block 122) an update to one or more blocks in the data group 12a, 12b, a determination is made (at block 124) as to whether the data being updated has been updated since the logical copy ($T_0$ ... $T_n$) was established. As discussed, the logical copy programs 16a, 16b maintain bitmaps and metadata indicating blocks subject to the logical copy relationship that have been updated since the logical copy was created. If (at block 124) the blocks were not previously updated since the logical copy 10a ... 10n, 11a ... 11n in was established, then the data to update is copied (at block 126) to the logical copy 10a ... 10n, 11a ... 11n. In this way the logical copy maintains data blocks as of the point-in-time ($T_0$ ... $T_n$) that were changed following the creation of the logical copy previous logical copy. From block 126 or the yes branch of block 124, the received update is applied (at block 128) to the data group 12a, 12b.

Figure 5:
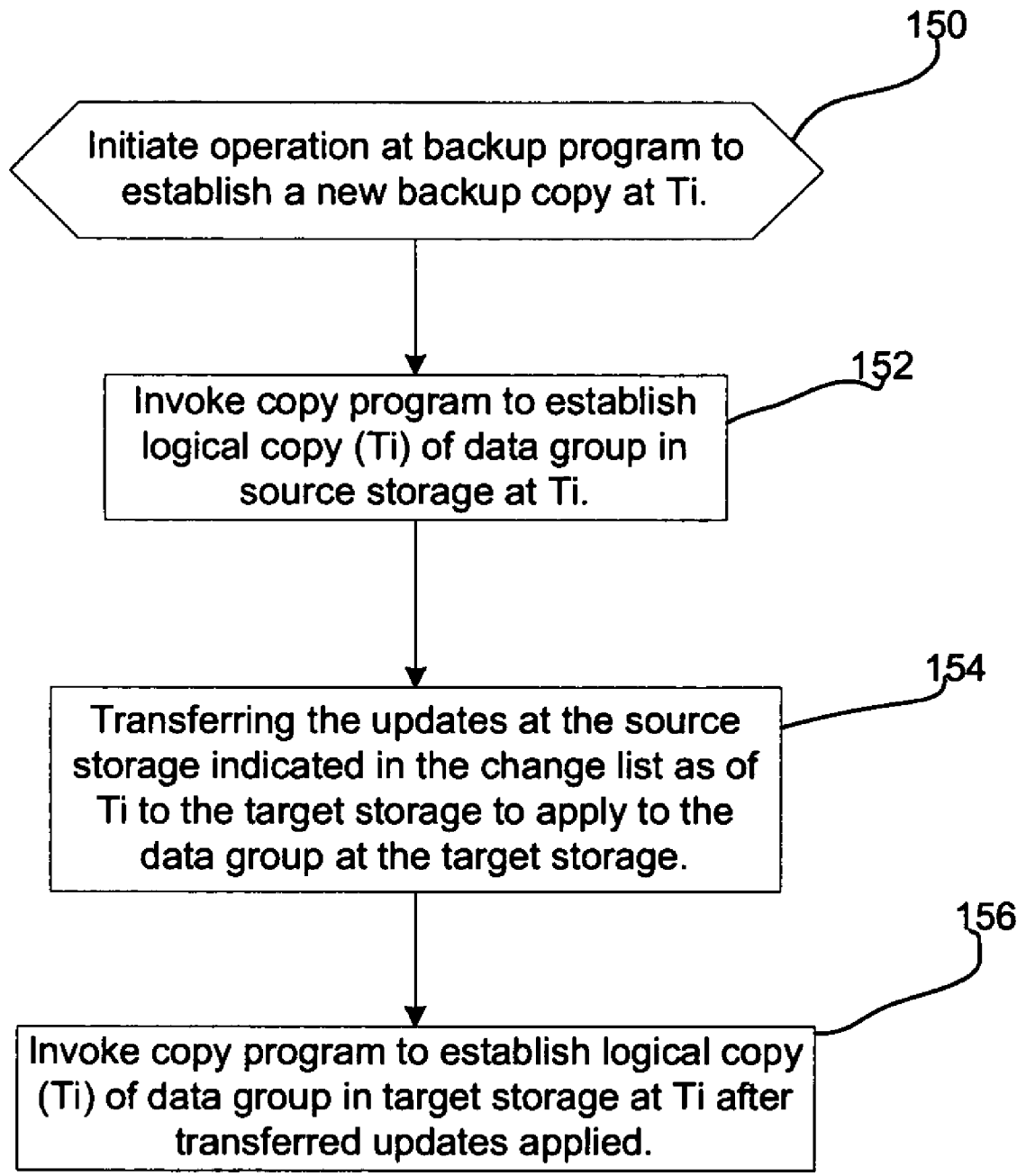
FIG. 5 illustrates an embodiment of operations to create-an additional point-in-time copy of data.

FIG. 5 illustrates an embodiment of operations performed by the backup program 8 to create a new backup set or new point-in-time copy ($T_1$ ... $T_n$) following the initial point-in-time copy ($T_0$). Upon initiating (at block 150) an operation to create a new point-in-time copy at $T_i$, which may be created according to a user selected schedule of backups, the backup program 8 invokes (at block 152) the logical copy program 16a to establish logical copy ($T_i$) of the data group 12a in the source storage at the current point-in-time ($T_i$). The backup program 8 further transfers (at block 154) the updates at the source storage 12a indicated in the change list 22a ... 22n as of $T_i$ to the target storage 14b to apply to the data group 12b at the target storage 14b. The change list 22a ... 22n is associated with a logical copy 10a ... 10n, and change list ($T_i$) provides updates made to the data storage since the point-in-time ($T_i$) of the associated logical copy 10a, 10b ... 10n and before the subsequent logical copy ($T_{i+1}$) is created. Thus, the change list 22a ... 22n provides information on the updates to the data group 12a between two point-in-time logical copies. The logical copy program 16b at the target computer 14a is invoked (at block 156) to establish logical copy 11i for the data group 12b in the target storage at the point-in-time $T_i$ after the transferred updates in the are applied. The logical copy program 16a at the target computer 14b may be invoked by the backup program 8 issuing an API over the network 24 to control the target logical copy program 16b or may be invoked by a user or administrator prompted by the backup program 8 to create a point-in-time copy on the target storage 14b. In this way, the backup program 8 sends a signal to cause the establishment of a logical copy 11a ... 11n of the data group 12b at the target storage 14b. This signal may generate an alert to notify a user/administrator to invoke the logical copy program 16b to create the logical copy 11a ... 11n or a signal that is communicated over the network 24 to the logical copy program 16b to generate the logical copy.

Figure 6:
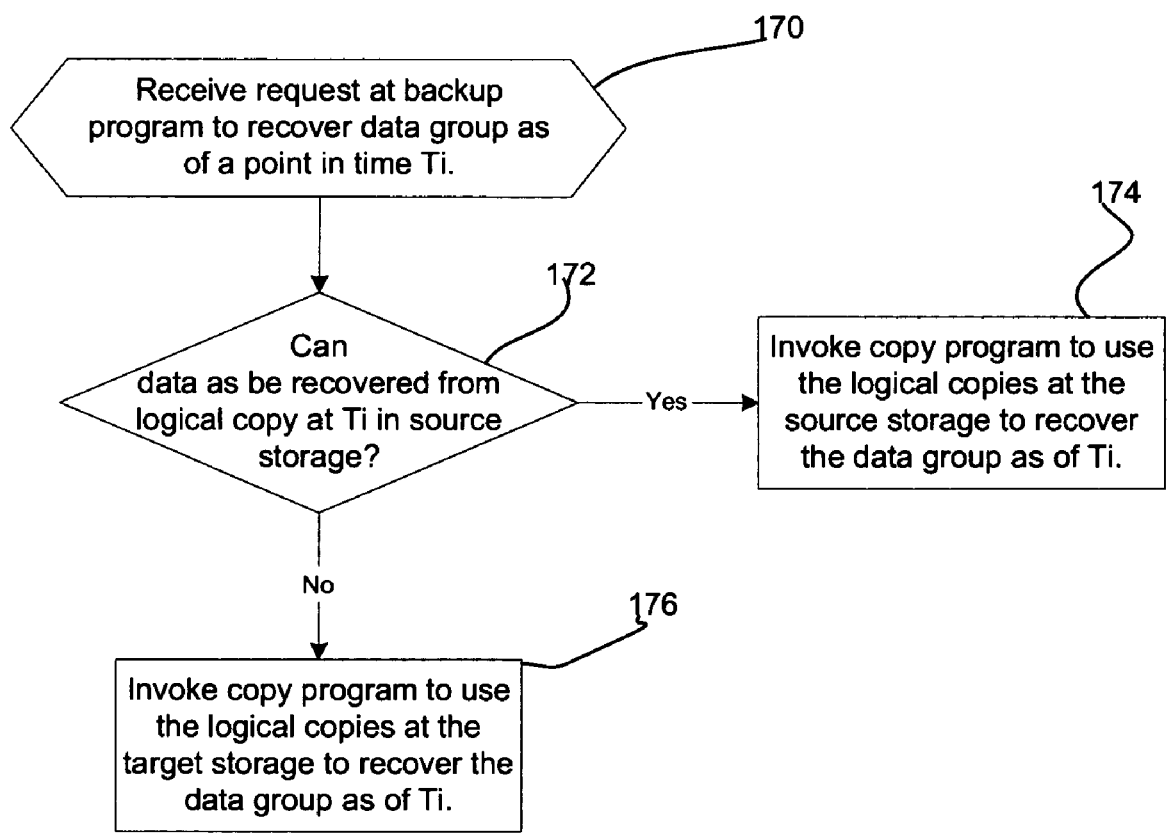
FIG. 6 illustrates an embodiment of operations to recover a copy of the data group as of a specified point-in-time.

FIG. 6 illustrates an embodiment of operations performed to recover the data group as of a point-in-time $T_i$. Upon the backup program 8 receiving (at block 170) a request to recover the data group as of a point in time Ti, the backup program 8 determines (at block 172) whether the data group as of $T_i$ can be recovered from the logical copies 10a ... 10n at the source storage 14a. If so, then the data group as of $T_i$ is recovered (at block 174) from the logical copies 10a ... 10(i) at the source storage 14a. In certain embodiments, the backup program 8 may call an API to invoke the logical copy program 16a to restore the data group as of the point-in-time ($T_i$) or notify the user/administrator to use the logical copy program 16a to restore the data group as of the point-in-time. If (at block 172) the data group as of $T_i$ cannot be recovered form the source storage 14a, then the data group as of $T_i$ is recovered (at block 176) from the logical copies 11a ... 11(i) at the target storage 14b by calls made from the backup program 8 or from a user invoking the copy program 16b in response to notifications or alerts from the backup program 8.

In Snapshot embodiments where the logical copies 10a ... 10n, 11a ... 11n comprise Snapshot copies, the logical copy programs 16a, 16b may use the current data group 12a, 12b and the logical copies 10a ... 10i, 11a ... 11i for logical copies from the initial logical copy to the logical copy as of $T_i$ to recover the data group as of the point-in-time $T_i$ in a manner known in the Snapshot art. For instance, the current active data group 12a, 12b may be adjusted by processing the logical copies sequentially to obtain the data group as of the point-in-time $T_i$.

In the embodiment of FIG. 2, the backup program 8c may operate as the backup program 8 described with respect to FIG. 1 except that the backup program 8 or user invokes the same logical copy program 16c to create logical copies 58a ... 58n, 60a ... 60n in the source 52a and target 52b storages and use the logical copies 58a ... 58n, 60a ... 60n to recover the data group as of different points-in-time.

The described embodiments provide techniques to maintain logical copies of a backup data group at a source and target storages to allow recovery of the data group as of different point-in-times for which the logical copies are maintained. Further, with the described embodiments, only changed data is copied over to the target storage when creating a new backup data group as of a different point-in-time. Still further, with described embodiments, the source and target systems may use different logical copy programs implementing the same logical copy feature, e.g., Snapshot, with non-compatible programs from different vendors or using different logical copy technologies.

Additional Embodiment Details

The described operations may be implemented as a method, apparatus or article of manufacture using standard programming and/or engineering techniques to produce software, firmware, hardware, or any combination thereof. The term "article of manufacture" as used herein refers to code or logic implemented in a medium, where such medium may comprise hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The computer readable medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

In described embodiments, the Snapshot copy technology was used to create the logical copies. In an alternative embodiment, other logical copy technologies may be used to establish a copy of data without having to create an entire physical copy of the data.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 3, 4, 5, and 6 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
   establishing a first logical copy of a data group in a source storage at a first point-in-time, wherein the first logical copy maintains data to reconstruct the data group as of the first point-in time after the data group has been updated following the first-point-in time, wherein the first logical copy further indicates updates to the data group after the first point in time;
   copying the data group from the source storage to the target storage;
   indicating regions of the data group updated at the storage after establishing the first logical copy in a change list;
   applying the updates in the change list to the data group at the source storage to provide the data group at the target storage as of a second point in time;
   establishing a second logical copy of the data group in the source storage at the second point-in-time, wherein the second logical copy maintains data to reconstruct the data group as of the second point-in-time after the data group has been updated following the second point-in-time, wherein the second logical copy further indicates updates to the data group after the second point-in-time; and
   establishing a third logical copy of the data group in the target storage at the second point-in-time, wherein the third logical copy maintains data to reconstruct the data group at the target storage as of the second point-in-time after the data group has been updated following the second point-in time, wherein the third logical copy further indicates updates to the data group at the target storage after the second point-in-time.

2. The method of claim 1, wherein the data group at the target storage mirrors the source storage data group as of the second point-in-time.

3. The method of claim 2, wherein a backup program invokes a logical copy program to establish the first and second logical copies of the data group at the source storage, and wherein the backup program records updates to the data group to indicate the regions of the data group that have been updated and to save the indicated regions in the change list, and wherein the backup program transfers the updates indicated in the change list to the target storage.

4. The method of claim 2, wherein the logical copies on the source and target storages are established by a source and target snapshot copy programs, wherein the source and target snapshot programs are from different vendors and use different implementations of snapshot technology to establish the logical copies.

5. The method of claim 1, further comprising:
   receiving an update to the data group in the source storage after the first point-in-time;
   determining whether the data to update in the source storage has been updated subsequent to the second point-in-time;
   copying the data to update to the second logical copy in response to determining that the data to update has not been updated subsequent to the second point-in-time;
   applying the received update to the data group in the source storage in response to copying the data to update; and
   applying the received update to the data group in the source storage in response to determining that the data to update has been updated subsequent to the second point in time.

6. The method of claim 1, further comprising:
   establishing an additional logical copy of the data group in the source storage at an additional point-in-time following a previous point-in-time at which a previous logical copy of the data group at the source storage was made;
   indicating regions of the data group updated at the storage after establishing the additional logical copy; and
   saving the indicated regions of the data group updated between the previous and additional point-in-time to an additional change list.

7. The method of claim 1, further comprising:
   using a logical copy on one of the source storage or target storage as of a selected point-in-time to recover the data group as of the selected point-in-time.

8. The method of claim 3, wherein the backup program invokes the logical copy program to establish the third logical copy of the data group at the target storage.

9. The method of claim 1, further comprising:
   processing a request to recover the data group as of the second point-in-time;

determining whether the data group can be recovered from a logical copy on the source storage;

recovering the data group as of the second point-in-time from the second logical copy and the data group on the source storage in response to determining that the data group can be recovered from the logical copy on the source storage; and recovering the data group as of the second point-in-time from the third logical copy and the data group on the target storage in response to determining that the data group cannot be recovered from the logical copy on the source storage.

* * * * *